US005695177A

United States Patent [19]

Mascola

[11] Patent Number: 5,695,177

[45] Date of Patent: Dec. 9, 1997

[54] HYDRAULIC SWING CLAMP APPARATUS HAVING SPEED CONTROL MECHANISM

[75] Inventor: James V. Mascola, Emporia, Kans.

[73] Assignee: Vektek, Inc., Emporia, Kans.

[21] Appl. No.: 753,695

[22] Filed: Nov. 27, 1996

[51] Int. Cl.[6] .......... B23Q 3/08

[52] U.S. Cl. .......... 269/24; 269/25; 269/27; 269/30; 269/20

[58] Field of Search .......... 269/24, 25, 30, 269/32, 20, 27, 31, 138, 229, 233

[56] References Cited

U.S. PATENT DOCUMENTS

| | | | |
|---|---|---|---|
| 2,860,590 | 11/1958 | Orr . | |
| 3,025,838 | 3/1962 | Klancnik . | |
| 3,126,795 | 3/1964 | Kesselring . | |
| 3,202,060 | 8/1965 | Grotness . | |
| 3,524,386 | 8/1970 | Cudnohulsky . | |
| 3,572,216 | 3/1971 | Seesody | 269/32 |
| 3,948,502 | 4/1976 | Waller et al. | 269/27 |
| 4,073,311 | 2/1978 | McGeachy . | |
| 4,164,344 | 8/1979 | Deragne | 269/27 |
| 4,500,079 | 2/1985 | Morghen . | |
| 4,560,152 | 12/1985 | Miller | 269/24 |
| 4,799,657 | 1/1989 | Miller | 269/24 |
| 4,909,493 | 3/1990 | Yonezawa . | |
| 4,934,672 | 6/1990 | Craft . | |
| 5,192,058 | 3/1993 | VanDalsem et al. | 269/24 |
| 5,437,440 | 8/1995 | Keaton | 269/32 |

*Primary Examiner*—Timothy V. Eley
*Assistant Examiner*—Lee Wilson
*Attorney, Agent, or Firm*—Hovey, Williams, Timmons & Collins

[57] ABSTRACT

A hydraulically-operated swing clamp (16) shiftable between a retracted, clamping position and an extended, releasing position is disclosed. The swing clamp (16) includes a speed control mechanism (26,52,54), which is formed directly on the clamp (16), for selectively and individually varying the speed at which the clamp (16) is shifted between its extended and retracted positions.

11 Claims, 1 Drawing Sheet

HYDRAULIC SWING CLAMP APPARATUS HAVING SPEED CONTROL MECHANISM

BACKGROUND OF THE INVENTION

1. Field of the Invention

The present invention relates to hydraulically-operated clamps for holding and clamping workpieces to fixtures. More particularly, the invention relates to a hydraulically-operated swing clamp including a speed control mechanism for selectively varying the actuation speed at which the clamp is shifted between its clamping and releasing positions.

2. Description of the Prior Art

Clamping devices are commonly used in manufacturing operations to hold and clamp workpieces to stationary fixtures so that the workpieces may be machined or otherwise worked upon. Known hydraulic clamping devices typically include a cylinder body adapted for attachment to a fixture, a piston telescopically received within the cylinder body for movement between a retracted, clamping position and an extended, releasing position when hydraulic fluid is supplied to the cylinder body, and a clamping head attached to the distal end of the piston for holding and clamping the workpiece to the fixture when the piston is shifted to its clamping position. Typically, several such clamping devices are mounted to a single fixture so that a workpiece can be securely held from several sides while it is worked upon.

Swing clamps are specific types of hydraulic clamps that include mechanisms that rotate their pistons and clamping heads relative to their cylinder bodies when the pistons are shifted between their retracted and extended positions. Swing clamps make it easier to load and unload workpieces from fixtures, especially in confined spaces.

It is often desirable to adjust the actuation speed at which the piston of a hydraulic clamp is shifted between its clamping and releasing positions to coordinate the clamping operation with other manufacturing operations. It is known to provide such actuation speed control by varying the hydraulic fluid flow rate to the clamping devices from a remote location. Hydraulic fluid flow rate control is typically accomplished by either adjusting the speed of the hydraulic pump supplying hydraulic fluid to the clamping device or by opening or closing valves disposed within the hydraulic tubing that delivers hydraulic fluid to or discharges hydraulic fluid from the clamping devices.

Unfortunately, these prior art methods of speed control cannot selectively and independently adjust the actuation speed of each of several clamping devices attached to the same fixture and coupled to the same hydraulic source. This is because when the speed of the hydraulic pump is adjusted or when the valves in the hydraulic tubing extending between the pump and the clamping devices are adjusted, the actuation speed of all of the clamping devices is adjusted.

This limitation of prior art clamping devices is significant because it is often desirable to control the actuation speeds of a plurality of clamps attached to a single fixture and coupled to the same hydraulic source independently of one another. Specifically, it is often desirable to shift one or more clamps to their clamping or releasing positions more quickly or slowly than other clamps to accommodate certain mounting and unmounting operations.

OBJECTS AND SUMMARY OF THE INVENTION

In view of the above-described limitations of prior art hydraulic clamps, it is an object of the present invention to provide a hydraulic clamp having an improved actuation speed control mechanism.

It is a more specific object of the present invention to provide a hydraulic clamp having a speed control mechanism that permits the actuation speed of the clamp to be selectively and individually varied independently of other hydraulic clamps coupled with the same hydraulic fluid source.

The present invention achieves these objects and other objects that become evident from the description of the preferred embodiments of the invention herein by providing a hydraulic clamp with improved speed control mechanism. The preferred hydraulic clamp is configured for clamping or holding a workpiece to a fixture and broadly includes: a cylinder body configured for attachment to the fixture; a piston telescopically received within the cylinder body for movement between a retracted, clamping position and an extended, releasing position; a clamping head fixed to the upper end of the piston for engaging and clamping the workpiece to the fixture when the piston is positioned in its retracted, clamping position; at least one hydraulic port formed in the cylinder body for supplying hydraulic fluid to and discharging hydraulic fluid from the cylinder body; and flow control means, formed in the cylinder body, for selectively varying the rate of hydraulic fluid flow supplied to or discharged from the cylinder body for selectively adjusting the actuation speed of the clamp.

The preferred flow control means incudes a valve port formed in the cylinder body and in fluid communication with one of the hydraulic ports in the cylinder body and a flow control valve operably received within the valve port. The flow control valve can be manually moved to various positions in the valve port so that it moves into and out of one of the hydraulic ports to control the flow of hydraulic fluid into or out of the cylinder body.

By constructing a hydraulic clamp with a speed control mechanism as described herein, numerous advantages are realized. For example, by constructing the flow control means directly on the cylinder body of the clamp rather than in the hydraulic pump or tubing, the actuation speed of the hydraulic clamp can be selectively and individually adjusted at the clamp itself. This permits the actuation speeds of a plurality of hydraulic clamps attached to a single fixture and coupled with a single hydraulic source to be selectively and individually adjusted independently of one another to accommodate specific machining and manufacturing processes.

Additionally, by constructing the speed control mechanism with a readily accessible valve on each clamp, a user can quickly and easily adjust the actuation speed of a particular hydraulic clamp by simply adjusting the position of the valve of that clamp.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
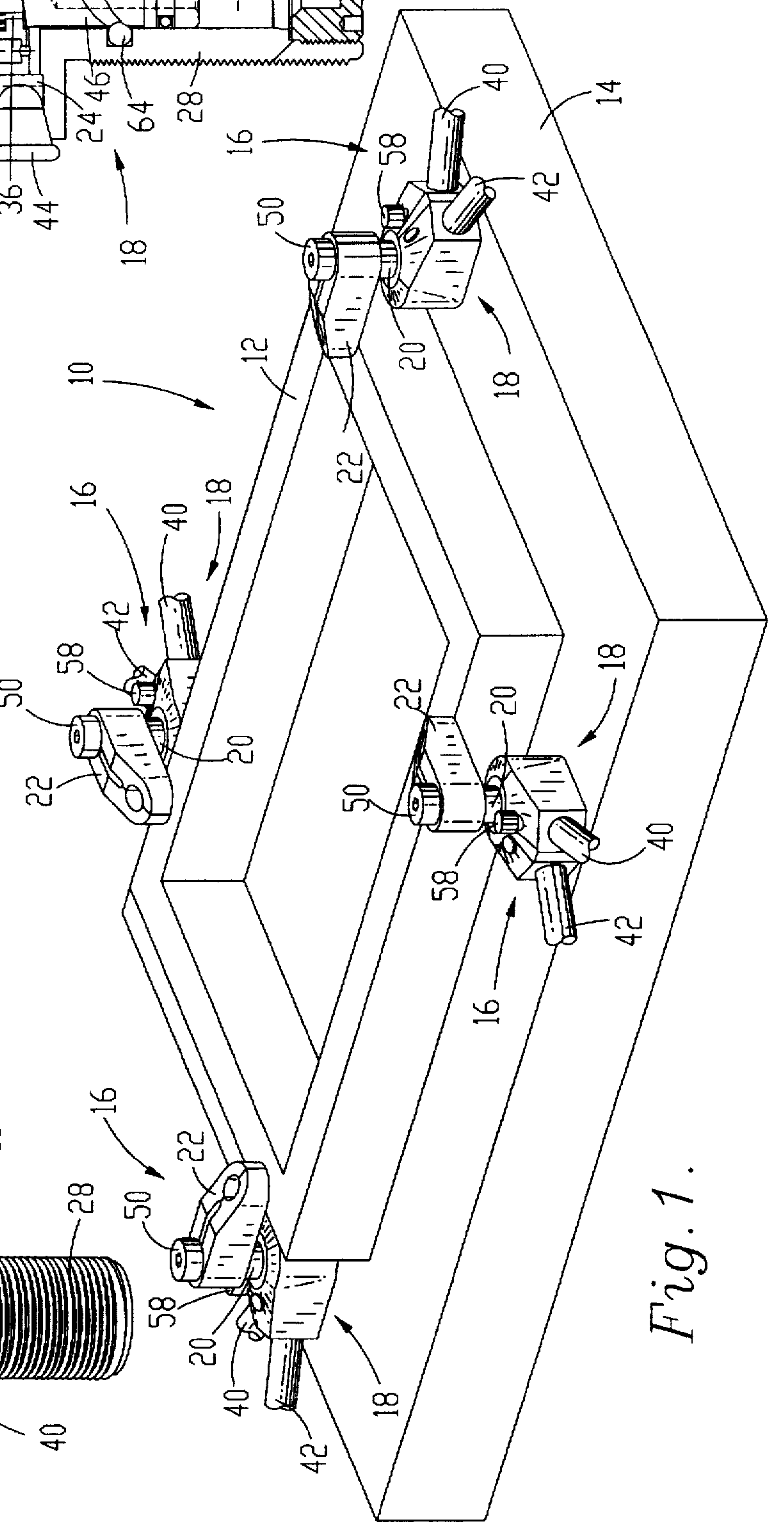
FIG. 1 is a perspective view of a clamping assembly constructed in accordance with a preferred embodiment of the present invention illustrating a plurality of hydraulic clamps holding and clamping a workpiece to a fixture.

Turning now to the drawing figures, and particularly FIG. 1, a clamping assembly 10 constructed in accordance with a preferred embodiment of the invention is illustrated. The clamping assembly 10 is operable for holding or clamping a workpiece 12 and broadly includes a fixture 14 for supporting the workpiece thereon and a plurality of hydraulic clamps 16 attached to the fixture for clamping the workpiece to the fixture.

In more detail, the fixture 14 may be any generally planar support surface and preferably has a plurality of bore holes or slots formed in its upper surface. The bore holes are threaded for receiving the hydraulic clamps 16 as described below. The fixture 14 may be attached to a larger stationary base support or may be unattached so that it can be easily transported in a machining and manufacturing plant.

Figure 3:
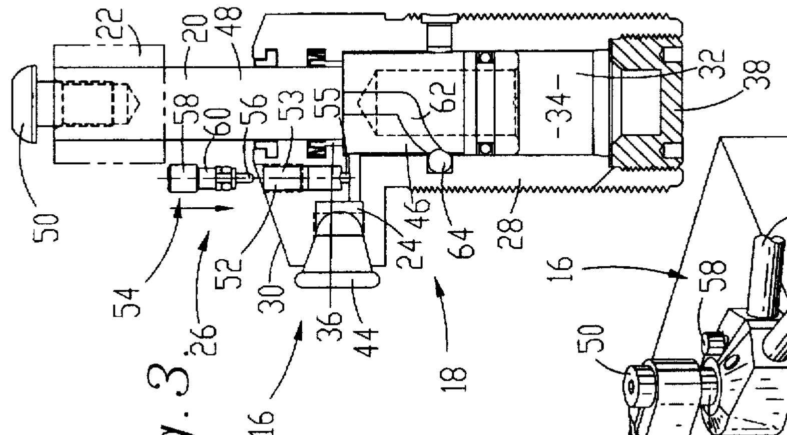
FIG. 3 is a vertical section view of a hydraulic clamp illustrating the internal components of the clamp in more detail.

The hydraulic clamps 16 are preferably swing-type clamps and may be either single or double-acting. The clamps 16 are identical to one another, and as best illustrated in FIG. 3, each broadly includes a cylinder body 18, a piston 20 telescopically received within the cylinder body, a clamping head 22 fixed to the upper end of the piston, at least one hydraulic port 24 formed in the cylinder body for supplying hydraulic fluid to and discharging hydraulic fluid from the cylinder body, and flow control means, generally referred to by the numeral 26, for selectively varying the rate of hydraulic fluid flow supplied to or discharged from the cylinder body. Those skilled in the art will appreciate that the hydraulic clamps 16 may also include gaskets, seals, and wipers found in other conventional hydraulic clamps.

The cylinder body 18 includes a lower, elongated, hollow shank portion 28 and an upper, enlarged flange portion 30. An elongated, hollow piston-receiving chamber 32 is formed through the center of the shank portion 28 and flange portion 30 and extends through the entire length of the cylinder body 18. The piston-receiving chamber 32 has a first, relatively larger diameter portion 34 extending through the shank portion 28 and a second, relatively smaller diameter portion 36 extending through the flange portion 30. Both portions 34,36 of the piston-receiving chamber 32 are preferably circular in cross section.

Figure 2:
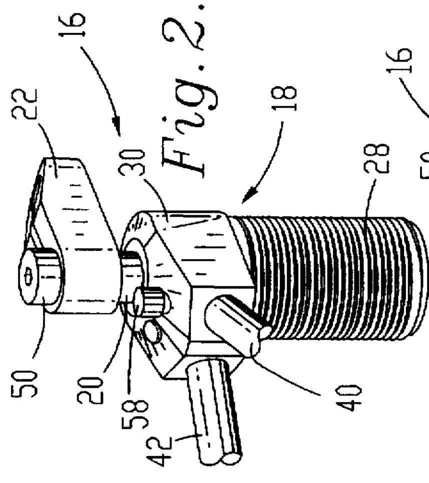
FIG. 2 is a perspective view of one of the hydraulic clamps of the clamping assembly illustrated in FIG. 1.

The periphery of the shank portion 28 is threaded as best illustrated in FIG. 2 for engaging the threading in the bore holes formed in the fixture 14. As illustrated in FIG. 1, the shank portions 28 of the clamps 16 are threaded into the bore holes so that the flange portions 30 of the clamps 16 are generally flush with the upper surface of the fixture 14.

Returning to FIG. 3, a removable retainer plug 38 is threadably received into the bottom of the shank portion 28. When the retainer plug 38 is removed from the shank portion 28, the piston 20 may be removed from the piston-receiving chamber 32 of the cylinder body 18 as described in more detail below.

The first hydraulic port 24 extends horizontally into one side of the flange portion 30 and is in fluid communication with the smaller diameter portion 36 of the piston-receiving chamber 32. The port 24 is coupled with a hydraulic fluid source (not shown) by hydraulic tubing 40 illustrated in FIG. 2 for supplying hydraulic fluid to and discharging hydraulic fluid from the smaller diameter portion 36 of the piston-receiving chamber 32. The piston 20 is moved from its extended, releasing position to its retracted, clamping position when hydraulic fluid is pumped through the first port 24 to the smaller diameter portion 36 of the piston-receiving chamber 32.

The double-acting hydraulic clamps illustrated in the drawing figures also each include a second hydraulic port coupled with the same hydraulic fluid source as the first hydraulic port 24 by hydraulic tubing 42 illustrated in FIG. 2. The second port extends horizontally into the flange portion 30 and then turns vertically downwardly through the shank portion 18 and terminates in fluid communication with the larger diameter portion 34 of the piston-receiving chamber 32. The second hydraulic port delivers hydraulic fluid to and discharges hydraulic fluid from the larger diameter portion 34 of the piston-receiving chamber 32. The piston 20 is moved from its retracted, clamping position to its extended, releasing position when hydraulic fluid is pumped through the second port to the larger diameter portion 34 of the piston-receiving chamber 32.

The first and second hydraulic ports may be sealed by rubber plugs 44 illustrated in FIG. 3 when the hydraulic clamp 16 is disconnected from the hydraulic tubing 40,42. This prevents dust and other debris from entering the piston-receiving chamber 32 of the cylinder body 18.

Those skilled in the art will appreciate that the second hydraulic port may be replaced with a spring or other biasing means (not shown) positioned in the larger diameter portion 34 of the cylinder body 18 to convert the illustrated double-acting clamp to a single-acting clamp.

The piston 20 is telescopically received within the piston-receiving chamber 32 of the cylinder body 18 for movement relative to the cylinder body between a retracted, clamping position depicted in FIG. 1 and an extended, releasing position depicted in FIG. 3. As best illustrated in FIG. 3, the piston 20 includes a lower, relatively larger diameter portion 46 and an upper, relatively smaller diameter portion 48.

The lower portion 46 of the piston 20 is received within the first, relatively larger diameter portion 34 of the piston-receiving chamber 32. The upper portion 48 of the piston 20 is received within the second, relatively smaller diameter portion 36 of the piston-receiving chamber 32 and extends upwardly out of the cylinder body 18. Both portions 46,48 of the piston 20 are preferably generally circular in cross section.

The clamping head 22 is attached to the top of the piston 20 so that it engages and clamps the workpiece 12 to the fixture 14 when the piston is positioned in its retracted, clamping position. The clamping head 22 is preferably secured to the top of the piston 20 by a removable threaded plug 50 or button, but may also be attached by other conventional fastening means.

The flow control means 26 illustrated in FIG. 3 is formed directly in the cylinder body 18 and is provided for selectively varying the rate of hydraulic fluid flow supplied to or discharged from the cylinder body for selectively controlling the speed at which the piston 20 is moved between its clamping and releasing positions. The preferred flow control means 26 includes a valve port 52 and a flow control valve 54 shiftably received within the valve port.

The valve port 52 is preferably formed through the readily accessible top face of the flange portion 30 of the cylinder body 18 and extends vertically downwardly into the cylinder body so that it is in fluid communication with either the first 24 or second hydraulic ports. The valve port 52 includes an upper enlarged portion 53 that opens through the top face of the flange portion 30 and a lower, tapered portion 55 that opens into one of the hydraulic ports. The interior wall of the enlarged portion 53 is threaded for receiving the flow control valve 54.

The flow control valve 54 includes a lower needle valve 56, an upper, manually-operable knob 58, and an interconnecting stem 60. The needle valve 56 is received within the tapered portion 55 of the valve port 52, and the knob 58 extends upwardly through the top face of the flange portion 30. The stem 60 is threadably received within the enlarged portion 53 of the valve port 52 so that when the knob 58 is rotated, the needle valve 56 is moved relative to the tapered portion 55 of the valve port 52. This moves the needle valve 56 into and out of the first or second hydraulic ports for controlling the rate of flow of hydraulic fluid into or out of the cylinder body 18.

The knob 58 can be manually rotated without the use of tools either clockwise or counter clockwise to shift the needle valve 56 to an infinite number of positions between an unblocking position and a blocking position. When the needle valve 56 is shifted to its unblocking position, it is completely removed from the first or second hydraulic port for permitting a relatively larger rate of hydraulic fluid flow to be supplied to or discharged from the cylinder body 18. Conversely, when the needle valve 56 is shifted toward its blocking position, it extends through the tapered portion 55 of the valve port 52 and at least partially into the first 24 or second hydraulic port for permitting a relatively lower rate of hydraulic fluid flow to be supplied to or discharged from the cylinder body 18.

The hydraulic clamp 16 also preferably includes swinging means for swinging the piston 20 and clamping head 22 between engaging and non-engaging positions relative to the cylinder body 18 when the piston is shifted between its extended and retracted positions. Specifically, the swinging means swings the piston 20 and clamping head 22 to a non-engaging position wherein the clamping head is rotated approximately 90 degrees in either direction from the positions illustrated in FIG. 1 when the piston is shifted to its extended, releasing position. The swinging means then swings the piston 20 and clamping head 22 to an engaging position wherein the clamping head is rotated to the positions illustrated in FIG. 1 when the piston is shifted to its retracted, clamping position.

As illustrated in FIG. 3, the preferred swinging means includes a cam track 62 formed in the periphery of the piston 20 and a ball 64 attached to the interior wall of the cylinder body 18. The ball 64, which acts as a cam follower, is received within the cam track 62 for movement along the cam track when the piston 20 is shifted between its extended and retracted positions. The cam track 62 and the ball 64 cooperate for swinging the piston 20 relative to the cylinder body 18 during telescopic movement of the piston relative to the cylinder body 18.

In operation of the clamping assembly 10, the pistons 20 and the clamping heads 22 of the hydraulic clamps 16 are initially placed in their extended, releasing positions illustrated in FIG. 3 so that the clamping heads are telescopically shifted and turned away from the workpiece. This allows a user to quickly and easily place a workpiece 12 on or remove a workpiece from the fixture 14.

When it is desired to clamp the workpiece 12 to the fixture 14, hydraulic fluid is supplied to the first hydraulic port 24 and hydraulic fluid is discharged from the second hydraulic port in a conventional manner to shift the piston 20 and clamping head 22 to their retracted, clamping positions. During downward shifting of the piston 20 to its clamping position, the cam-follower ball 64 and cam track 62 cooperate to rotate the piston and clamping head 22 to the positions illustrated in FIG. 1.

When it is desired to unclamp the workpiece 12 from the fixture 14, hydraulic fluid is supplied to the second hydraulic port and hydraulic fluid is discharged from the first hydraulic port 24 to shift the piston 20 and clamping head 22 to their extended, releasing positions. During upward shifting of the piston 20 to its unclamping position, the cam-follower ball 64 and cam track 62 cooperate to rotate the piston and clamping head 22 90 degrees from the positions illustrated in FIG. 1.

Advantageously, the operator of the clamping assembly 10 may at any time during the operation of the assembly selectively and individually adjust the actuation speed of the hydraulic clamps 16 by merely rotating the adjustment knobs 54 for adjusting the position of the needle valves 56 in the valve ports 52. For example, if the operator desires to adjust the actuating speed of one of the hydraulic clamps 16 so that it shifts to its clamping or releasing positions more quickly or more slowly than other clamps, the operator can adjust the flow control valve 54 on that particular hydraulic clamp while leaving the actuation speed of the other hydraulic clamps the same. The operator may also adjust the actuation speeds of all the clamps 16 to provide a sequential or stepped clamping or releasing operation on a workpiece 12. These selective and individual actuation speed control adjustments cannot be accomplished with known prior art speed control methods.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A hydraulically-operated clamp for clamping a workpiece to a fixture, the clamp comprising:

a cylinder body for attachment to the fixture, the cylinder body having a top face;

a piston telescopically received within the cylinder body for movement between a retracted, clamping position and an extended, releasing position at a speed;

a first hydraulic port formed in the cylinder body for supplying hydraulic fluid to and discharging hydraulic fluid from the cylinder body at a rate for moving the piston from the extended, releasing position to the retracted, clamping position;

a second hydraulic port formed in the cylinder body for supplying hydraulic fluid to and discharging hydraulic fluid from the cylinder body for moving the piston from the retracted, clamping position to the extended, releasing position; and flow control means, formed in the cylinder body, for selectively varying the rate of hydraulic fluid flow supplied to or discharged from the cylinder body for selectively controlling the speed at which the piston is moved between the extended, releasing and retracted, clamping positions, the flow control means including valve port formed in the cylinder body and in fluid communication with one of the first and second hydraulic ports, and a flow control valve operably received within the valve port for movement between an unblocking position wherein the flow control valve is completely removed from one of the first and second hydraulic ports for permitting a relatively larger rate of hydraulic fluid flow to be supplied to or discharged from the cylinder body and a blocking position wherein the flow control valve extends at least partially into one of the first and second hydraulic ports for permitting a relatively lower rate of hydraulic fluid flow to be supplied to or discharged from the cylinder body, the flow control valve being threadably received within the valve port for selective movement between a plurality of positions between the blocking and unblocking positions, the flow control valve including an adjustment knob that can be manually manipulated for moving the flow control valve between the unblocking and blocking positions, wherein the valve port is formed through the top face of the cylinder body and the adjustment knob extends from the top face of the cylinder body so that the adjustment knob is readily accessible.

2. The hydraulic clamp as set forth in claim 1, the flow control means providing infinite adjustment of the rate of hydraulic fluid flow supplied to or discharged from the cylinder body.

3. The hydraulic clamp as set forth in claim 1, further including a clamping head fixed to the piston for engaging and clamping the workpiece to the fixture when the piston is positioned in its retracted, clamping position.

4. A clamping assembly for clamping a workpiece, the clamping assembly comprising:

a fixture for supporting the workpiece thereon; and a plurality of hydraulic clamps for clamping the workpiece to the fixture, each of the clamps including a cylinder body configured for attachment to the fixture, the cylinder body having a top face, a piston telescopically received within the cylinder body for movement between a retracted, damping position and an extended, releasing position at a speed, a first hydraulic port formed in the cylinder body for supplying hydraulic fluid to and discharging hydraulic fluid from the cylinder body at a rate for moving the piston from the extended, releasing position to the retracted, clamping position, a second hydraulic port formed in the cylinder body for supplying hydraulic fluid to and discharging hydraulic fluid from the cylinder body for moving the piston from the retracted, clamping position to the extended, releasing position, and flow control means, formed in the cylinder body, for selectively varying the rate of hydraulic fluid flow supplied to or discharged from the cylinder body through the first hydraulic port for selectively controlling the speed at which the piston is shifted between the extended, releasing position and the retracted, clamping positions so that the clamping rate of each of the clamps can be selectively and individually controlled independently of one another, the flow control means including a valve port formed in the cylinder body and in fluid communication with one of the first and second hydraulic ports, and a flow control valve operably received within the valve port for movement between an unblocking position wherein the valve is completely removed from one of the first and second hydraulic ports for permitting a relatively larger rate of hydraulic fluid flow to be supplied to or discharged from the cylinder body and a blocking position wherein the valve extends at least partially into one of the first and second hydraulic ports for permitting a relatively lower rate of hydraulic fluid flow to be supplied to or discharged from the cylinder body, the flow control valve being threadably received within the valve port for selective movement between a plurality of positions between the blocking and unblocking positions, the flow control valve including an adjustment knob that can be manually manipulated for moving the valve between the unblocking and blocking positions, wherein the valve port is formed through the top face of the cylinder body and the adjustment knob extends from the top face of the cylinder body so that the adjustment knob is readily accessible.

5. The clamping assembly as set forth in claim 4, the flow control means providing infinite adjustment of the rate of hydraulic fluid flow supplied to or discharged from the cylinder body.

6. The clamping assembly as set forth in claim 4, further including a clamping head fixed to the piston for engaging and clamping the workpiece to the fixture when the piston is positioned in its retracted, clamping position.

7. A hydraulically-operated clamp for damping a workpiece to a fixture, the clamp comprising:

a cylinder body for attachment to the fixture;

a piston telescopically received within the cylinder body for movement between a retracted, clamping position and an extended, releasing position at a speed;

a first hydraulic port formed in the cylinder body for receiving an discharging hydraulic fluid from the cylinder body;

a passageway formed in the cylinder body between the port and the piston for delivering hydraulic fluid between the port and the cylinder body at a rate for moving the piston from the extended, releasing position to the retracted, clamping position;

moving means for moving the piston from the retracted, clamping position to the extended, releasing position; and flow control means, formed in the cylinder body and operably coupled with the passageway, for selectively varying the rate of hydraulic fluid flow supplied to or discharged from the cylinder body for selectively controlling the speed at which the piston is moved between the extended, releasing and retracted, clamping positions.

8. The hydraulic clamp as set forth in claim 7, the flow control means including means for blocking a selected portion of the passageway and leaving a portion of the passageway unblocked for permitting hydraulic fluid to flow in the unblocked portion of the passageway for selectively varying the rate of hydraulic fluid flow supplied to or discharged from the cylinder body.

9. The hydraulic clamp as set forth in claim 7, the flow control means including a valve port formed in the cylinder body and in fluid communication with the passageway, and a flow control valve operably received within the valve port for movement between an unblocking position wherein the flow control valve is completely removed from the passageway for permitting unobstructed hydraulic fluid flow in the passageway, a partially blocking position wherein the flow control valve partially blocks the passageway for partially reducing the hydraulic fluid flow in the passageway, and a blocking position wherein the flow control valve extends completely into the passageway for completely blocking the passageway for stopping the hydraulic fluid flow in the passageway.

10. The hydraulic clamp as set forth in claim 9, the flow control valve being threadably received within the valve port for selective movement between a plurality of positions between the blocking and unblocking positions, the flow control valve including an adjustment knob that can be manually manipulated for moving the valve between the unblocking and blocking positions.

11. The hydraulic clamp as set forth in claim 10, the cylinder body having a top face, wherein the valve port is formed through the top face of the cylinder body and the adjustment knob extends from the top face of the cylinder body so that the adjustment knob is readily accessible.

* * * * *